United States Patent Office 3,068,254
Patented Dec. 11, 1962

3,068,254
LOW VISCOSITY POLYMERIZED FATTY ACIDS POLYESTER RESINS AND METHOD OF MAKING SAME
Louis R. Le Bras, Pittsburgh, and Robert E. Park, New Kensington, Pa., assignors to Pittsburgh Plate Glass Company, Allegheny County, Pa.
No Drawing. Filed Feb. 20, 1958, Ser. No. 716,292
3 Claims. (Cl. 260—407)

This invention relates to flexible foams of polyurethane resins resulting from the reaction of a compound containing 2 or more isocyanate groups with a polyester of a polycarboxylic acid and a polyol, said polyester containing available hydroxyls. The invention has particular relationship to the preparation of foams of the foregoing type from organic polyisocyanates and polyesters in which the polycarboxylic acid component is of the type obtained by the addition reaction between a plurality of molecules of fatty acids containing double bonds (=).

It is to be understood that as used above, the term polycarboxylic acid includes acids containing 2 or more carboxyl groups. Likewise the terms "polyol" and "polyisocyanate" respectively contemplate compounds containing 2 or more hydroxyls and compounds containing 2 or more isocyanate groups.

It has heretofore been disclosed to form polyurethane resins by reacting in the presence of a tertiary amine as a catalyst an organic compound containing at least 2 isocyanate groups and a polyester of a nonethylenic, dicarboxylic acid, such as adipic acid and a polyol or mixture of polyols, such as diethylene glycol and glycerol. If water is included in the mixture, carbon dioxide in large volumes is also generated and foamed polyurethane resins are produced.

While very useful foamed polyurethane resins may be obtained by appropriately reacting polyesters of polycarboxylic acids, such as adipic acid and polyols, such as diethylene glycol and glycerol with isocyanates, such as tolylene, diisocyanate, the cost factor involved in the production of a suitable polyester component constitutes a serious impediment to the application of the foamed resins in many fields. The price is substantially above that of many other foamed materials, such as the foamed rubber and foams of polyurethanes prepared from polyethers and the like. The foams also tend to be of low resistance to moisture and to possess other detrimental properties.

It has previously been recognized that valuable di- and polycarboxylic acids could be formed by heating an unsaturated fatty acid, such as linoleic acid or linolenic acid, preferably in the presence of steam. Dimer acids and some trimer acids are formed in large amounts in the reaction. The structure of the dimer acids from linoleic acid may be represented as follows:

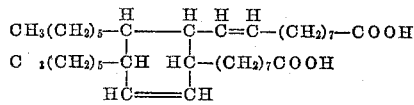

This dimer contains 36 carbon atoms.

A somewhat generalized structure of a dimer acid resulting from addition reaction of a triene fatty acid, such as linolenic acid is represented by the formula:

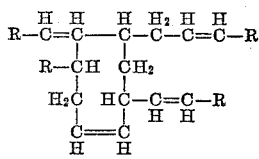

In the latter, the groups R are the terminals of the fatty acids undergoing dimerization and may be hydrocarbon or hydrocarbon with a carboxyl terminal, depending upon whether the groups R are of the "heads" or the "tails" of the fatty acids.

In some instances the reaction may proceed further to form such structures as a 54 carbon atom trimer:

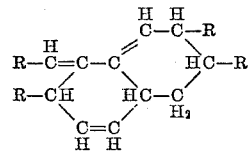

where the groups R have the significance previously attached. Probably other structures may also be provided but the foregoing are the more usual ones.

Numerous technical papers and patents have been published upon the preparation and various uses of these acids. Examples of such include:
 JACS, March 1947, pp. 65–68.
 Paint and Oil Chemical Review, January 4, 1954, pp. 13, 14, 16, 26, 28 and 29.
 U.S. Patents 2,482,760, 2,482,761.

Some monocarboxylic acids are usually present after the polymeriaztion of the oil acids. These should not be allowed greatly to exceed 1 percent by weight based upon the acid mixture. If the concentration is too high, it may be reduced, for example by distillation.

In a paper (No. 45) by D. T. Moore and M. H. Smith, given in the April 1957 meeting of the Division of Paints, Plastics and Printing Ink Chemistry in the American Chemical Society, it is disclosed to prepare foams of the polyurethane-type by reaction of an organic diisocyanate, such as tolylene diisocyanate and polyesters obtained by reaction of a mixture of polyols and a dimer acid of the foregoing type.

The composition of an illustrative mixture as disclosed on page 386 of the article comprises:

| | Moles |
|---|---|
| Polymerized acids | 1.0 |
| Diethylene glycol | 1.2 |
| Trimethylolethane | 0.2 |

The resulting products are relatively inexpensive and are of excellent properties, being substantially improved in important respects, such as in high temperature humidity resistance, softness and resilience, as compared with foams from polyesters of adipic acid.

Difficulty, however, has been experienced in the preparation of the polyurethane foams from polyesters of dimer acids, owing to the relatively high viscosity of the polyester component. The viscosity is so high in many instances, as to place severe demands upon the apparatus employed to mix the components prior to the foaming stage, particularly in continuous and intermittent types of commercial foam machines. Owing to this difficulty, foam units of large size cannot be formed because of the difficulty of preparing and pouring the foamable mixture before it gels prematurely.

This invention comprises the discovery that if in the formulation of the polyesters of diols and the poly-basic acids derived by addition to the unsaturated fatty acids, the diol component, or at least a substantial part thereof, is of a glycol containing a plurality of ether groups, polyesters of considerably lower viscosity are obtained. These polyesters can easily and rapidly be blended with polyisocyanates to form polyurethane resins even in large units.

Representative glycols containing a plurality of ether linkages and which may be used in forming the polyesters of this invention may employ either triethylene glycol or tetraethylene glycol; special emphasis is placed upon triethylene glycol which may be represented by the following structure:

$$HOCH_2CH_2-O-CH_2CH_2-O-CH_2CH_2OH$$

and is of a molar weight of 150.

The polymers of unsaturated fatty acids which may be employed in the formulation of polyesters useful for reaction with organic polyisocyanates to form foams in accordance with the provisions of the present invention comprise both dimers and trimers and even higher polymers and mixtures of dimer and trimer acids. Special emphasis, however, is placed upon the dimer acid, such as are formed by the addition reaction of linoleic acid. The formula of the dimer of this acid has already been given. Other important acids which may be polymerized to provide useful polycarboxylic acids include linolenic acid, parinaric acid, clupanodonic acid, licanic acid, elaeostearic acid and others. Usually, some oleic acid will be present in the commercial fatty acids most readily available for use in the preparation of the polyesters.

Pure or substantially pure unsaturated fatty acids may be employed in the dimerization or polymerization reaction involved in the preparation of the polycarboxylic acids. However, it is usually more economical to employ mixed acids, such as those from various oils, e.g. soya oil, linseed oil, safflower oil, cottonseed oil. Also, so-called foots acids from soap stock and fatty acids from tall oil, as well as many others may be employed in the dimerization reaction.

These acids are subjected to dimerization or trimerization by heating in well-known manner as taught in the foregoing articles or in U.S. Patent 2,482,761. The unsaturated acids and especially those containing two or more double bonds (=) dimerize or trimerize most readily. The saturated acids do not undergo a corresponding reaction.

It is important that the monocarboxylic acid content of the polycarboxylic acid mixture, whether from saturated (or unsaturated acids in the polymer acid product, be reduced to a low value, for example, below about 3 or 4 percent and preferably below 2 percent based upon the acid mixture. Polymer acids, such as dimer acids containing a higher percentage of monocarboxylic acids than this when reacted with polyisocyanates, do not provide satisfactory foamed products.

The reduction of the monomer acids content of the mixture containing the polymer acids may be accomplished by appropriate techniques as for example by distillation, under vacuum, or by steam distillation.

In forming polyesters suitable for reaction with organic polyisocyanates to produce foams, it is important that the polyesters include some unreacted hydroxyl groups. The glycols, such as triethylene glycol react with the dimer acids, to form ester chains in which any unreacted hydroxyl groups are terminal or primary. Trimer acids and higher polymeric acids may tend to react with a diol, such as diethylene glycol to povide branched and cross-linked chains. However, all of the hydroxyls are still terminal with respect to the chain or the branches thereof. These polyesters containing only terminal hydroxyls may be used to react with organic polyisocyanates and thus to form useful polyurethane foams applicable to many purposes.

Polyols containing three or more hydroxyls may be so reacted with the dimer or trimer acids as to introduce hydroxyls in selected zones in the polyester chain; for example, if the latter type of polyol is reacted with the acids concurrently with the diol component, hydroxyls may be introduced at least in part at intermediate points in the polyester chain. However, if, as is often preferred, the polyol of 3 or more hydroxyl content is added at a subsequent stage after the reaction of the diol and the acid components, the free hydroxyls tend to cluster at the ends of the polyester molecules in groups—$R(OH)_{n-1}$ where R is the organic portion of the polyol molecule and $n$ designates the number of starting hydroxyls and is 3 or more. Some triol or higher polyol appears to be necessary for some applications. Where intermediate hydroxyls are present, some of them may react with the polyisocyanate to produce cross-linking effects at intervals along the polyester chains. The terminal hydroxyls will also react to produce linear extensions.

Examples of polyols with 3 or more hydroxyls include glycerol, pentaerythritol, 1,2,6-hexanetriol, trimethylol propane, and trimethylol ethane, etc.

These polyols constitute aliphatic polyhydric alcohols containing from 3 to 6 carbon atoms.

Exceptionally useful polyols adapted for reaction with dimer or trimer acids in accordance with the provisions of the present invention include three or more methylol groups as represented in pentaerythritol, trimethylol ethane, trimethylol propane, and others. These constitute aliphatic alcohols containing from 5 to 6 carbon atoms and from 3 to 4 methylol groups. In these, all hydroxyls are primary and possess a high degree of reactivity with respect to isocyanate groups of the polyisocyanate.

If the ratio of carboxylic groups to hydroxyls in the reacting mixture employed in the formulation of the polyester be properly controlled, the polyesters obtained contain an adequate number of hydroxyls to react with the isocyanate groups in the formation of a useful polyurethane foam.

If flexible foams of optimum quality are to be obtained, the polyol content of the esterification mixture should be so adjusted that when the polyester content has attained the desired acid value (below 3) the hydroxyl value will be in the range of about 40 to about 75 and with a preferred hydroxyl content being in a range of about 55 to about 70.

The proportion of the glycol content with respect to the other reactants in the polyester should be adjusted with some care. It has been found, for example, that in a composition comprising about 70 to 75 parts by weight of polymer (dimer) acids with triethylene glycol as the dihydric component, the latter should be present in an amount of about 20 to 30 parts by weight and preferably within a range of about 23.6 to 28 parts by weight.

The polyol content (e.g. triol content, such as trimethylolethane), has an important bearing upon the cross-linking in the polyurethane foams. The compression deflection characteristics of the foams may be substantially increased or decreased as may be desired by increasing or decreasing the triol content; the higher the triol content, the higher the compression resistance in the foams from the polyester. The triol may be used to provide a composition comprising:

| | Parts by weight |
|---|---|
| Dimer acid | 70–75. |
| Triethylene glycol | 20–30. |
| Trimethylolethane | 0 to 6 (preferably 1 to 4). |

Usually, the dimer acid components of the polyester will also include some trimer acids and possibly other polycarboxylic acids. These can produce cross-linking or branching and are found to have a substantial bearing upon the amount of triol required to obtain a given compression resistance in the final polyurethane foam. For example, with a high ratio of trimer acids in the polymeric acid component, the ratio of triol may be reduced to or almost to the vanishing point. On the other hand, in polymeric acids where the trimer acid content is low, higher ratios of triol are advantageous. A range of trimer, or higher polymer acids, of about 5 to 35 percent based upon the mixture of polymer acids is suggested as being suitable in the polyesters employed in the practice of the present invention.

In the preparation of a polyester from a mixture of polymeric fatty, unsaturated acids and triethylene glycol and/or trimethylolethane, the reaction mixture may include solvents or diluents, such as xylene or toluene, however, they are not required and in general, the esterification is merely complicated if they are used. Generally they are omitted.

Catalysts of esterification reaction, likewise, are not required and usually it is preferred to operate in their absence. However, if for any reason one is desired, for example for purposes of speeding up the rate of reaction, paratoluene sulfuric acid is suggested as being among those which are effective. These may be employed in exceedingly small amounts, e.g. in a range of about 0.1 to 0.5 percent by weight of the reaction mixture. Stannic chloride or stannous chloride in similar amounts may also be used as a catalyst.

In conducting the reaction, a temperature in a range of about 195° C. to 255° C. may be employed advantageously. A preferred range, however, is approximately 230° C.–250° C.

The total cooking time for the esterification mixture, preferably, is in a range of about 7 hours to 20 hours.

*Example 1*

This example is illustrative of the preparation of a polyester of low viscosity and being suitable for reaction with a polyisocyanate under the provisions of the present invention.

The polymeric unsaturated fatty acid of this example is a commercial product sold by the Emery Industries, Inc., Cincinnati, Ohio, under the designation of "Emery 3065–S." This material comprises dimer acids (carbon content of 36 atoms) apparently of the formulation already given in an amount of about 75 percent by weight and trimer acids (carbon content of 54 atoms) in an amount of about 25 percent. The mixture of acids has a saponification number in a range of 191–199 and it is of an unsaponifiable content of 2 percent (maximum). The material is low in monobasic acid (distilling below 270° C. at 5 millimeters of mercury (absolute)), the maximum of monobasic acid being 1 percent. The material has an iodine value of about 90.5–97 which is slightly above that of oleic acid. The viscosity of these polymer acids is approximately in the range of 9,000 to 12,000 centipoises at 77° F.

The esterification mixture comprises:

| | Parts |
|---|---|
| Polymerized fatty acids such as Emery 3065–S | 72.7 |
| Triethylene glycol | 25.3 |
| Trimethylolethane | 2.0 |

It is within the purview of the invention to heat all of these as a mixture. However, it is usually preferred to heat only the polymerized acid component and the triethylene glycol to 300° F. for 1 hour under total reflux. At the end of that time, reflux is discontinued and the mixture is heated to about 465° F. until the acid value is brought within the range of 20–25. The trimethylolethane is added, and the mixture is heated at the foregoing temperature (465° F.) until the acid value has dropped to 10. The reaction mixture is then sparged with inert gas (e.g. $CO_2$) to aid in the removal of water, and cooking is continued at the foregoing temperature until an acid value below 3, e.g. 2, is obtained.

Heating is continued with sparging until a viscosity of I+ at 60 percent solids in the monoethyl ether of ethylene glycol is obtained. This corresponds to a viscosity of 18,000 to 27,000 centipoises at 77° F. and at 100 percent solids content. The final polyester has an acid number less than 3, a hydroxyl number below 70 and a maximum viscosity of 27,000 centipoises at 77° F.

A similar polyester prepared from the same acids in the same amount and with a similar amount of trimethylolethane but with diethylene glycol replacing the triethylene glycol (on a molar basis) of the foregoing polyester has a viscosity of 35,000 to 50,000 cps. at 77° F. when the acid value has been reduced below 3 and the hydroxyl value is under 70.

In accordance with this example, the polyester may comprise:

| | Percent by weight |
|---|---|
| Polymer acids | 70–75 |
| Triethylene glycol | 20–30 |

| | Total parts by weight |
|---|---|
| Trimethylolethane to give | 100 |

Polyesters prepared in accordance with the foregoing techniques have high compatibility with polyisocyanates including such tolylene diisocyanates as those sold commercially under such trade names as Hylene TM, Nacconate 80 and Mondur TD 80. These are mixtures of 80 percent 2,4-isomer and 20 percent 2,6-isomer. Still other commercial polyisocyanate mixtures comprise Hylene TM 65, Nacconate 65 and Mondur TD. These comprise 65 percent of 2,4-isomer and 35 percent of 2,6-isomer. Tolylene diisocyanate may be replaced by equivalent amounts of the commercial prepolymer sold as Mondur C and being of 3 moles of tolylene diisocyanate and 1 mole of hexanetriol. The resultant prepolymer contains a plurality of isocyanate groups. Other polyisocyanates which may be reacted with the low viscosity polyesters as disclosed in this application comprise:

Diphenyl diisocyanate
Triphenyl diisocyanate
Chlorophenyl 2,4-diisocyanate
Ethylene diisocyanate
1,4-tetramethylene diisocyanate
p-Phenylene diisocyanate
Hexamethylene diisocyanate
3,3'-dimethyl-4,4'-biphenylene diisocyanate
3,3'-dimethoxyl-4,4'-biphenylene diisocyanate
Polymethylene polyphenylisocyanate
Diphenylmethane-4,4'-diisocyanate and others. The tolylene diisocyanates because of general availability and satisfactory operation in this process, are usually preferred.

In the proportioning of the polyisocyanate component of the polyurethane resin, the polyisocyanate is preferably employed in an amount of about 1 equivalency with respect to the combination of hydroxyls and unreacted carboxyls of the polyester component. Ranges of diisocyanate may vary from about 0.5 equivalent to about 2 equivalents. In those instances in which the polyisocyanate component is relatively volatile, allowance may often be required for a certain degree of evaporation of the diisocyanate component during the operations of mixing, pouring or spreading and curing of the mixture.

When foams are to be prepared from the polyesters of this invention, it is preferable to make up the polyester component and the diisocyanate component as separate packages (A and B).

Package A comprises:

Polyester
    Water
    Emulsifier (if any)
    Catalyst
    Plasticizer (if any) [1]

[1] Plasticizer is optional.

These constitute an emulsion which can readily be mixed with polyisocyanate (tolylene diisocyanate by agitation).

Package B usually comprises the diisocyanate by itself.

Packages A and B should be kept separate until just before they are to be reacted to form a foam.

Water in package A is used in small amounts, e.g. about 0.1 to 10 parts by weight per 100 parts of polyester. This component may be agitated with the polyester to provide emulsification. Emulsifiers are not required, but are not precluded. Appropriate emulsifiers include Pluronic L61 sold by the Wyandotte Chemical Company. This material is understood to be a block polymer of polypropylene and polyethylene oxides. Other emulsifiers include Emulphor-El-719 which is understood to be polyoxyethylated vegetable oil, sodium or ammonium oleate and many others. These emulsifiers are optional and usually it is preferred to add the water in the absence of the emulsifier.

A catalyst to promote the reaction between the polyester-water emulsion and the polyisocyanate is usually included. These catalysts are most usually tertiary amines or compounds adapted to decompose under conditions of reaction between the polyester component and the polyisocyanate component to liberate a tertiary amine. Appropriate catalysts comprise N-methylmorpholine, N-ethylmorpholine, triethyl amine, dimethyl ethanol amine, diethylethanol amine, diethylcyclohexyl amine, 1,4-dimethylimidazole, and triethylene diamine of the formula:

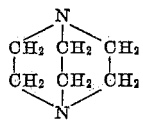

which is known under the trade name of Dabco, are included. Catalysts are usually employed in a range of about 0.2 to 5 percent based upon the polyester.

Plasticizers are optional and include didecyl phthalate and others. The polyesters of the polymeric unsaturated fatty acids and the triethylene glycol, when mixed with the components of package A, result in even lower viscosity in the package than that of the polyesters per se. For example, it has been found that a polyester of dimer acid and triethylene glycol as disclosed in Example I and being of a viscosity of 18,000 to about 27,000 when emulsified with water to provide a component A of a polyurethane foam mixture is of a viscosity of about 15,000 to 18,000. This low viscosity is of a great advantage in mixing the polyester package A with the diisocyanate package B since the power requirements are much reduced and the capacity of the apparatus is greatly increased. The increase in capacity of the apparatus permits forming relatively large units of foam material because the mixing, casting and molding operations can be completed before premature foaming and gelation can occur.

The foamable mixtures of components A and B can be foamed and cured by allowing them to stand at room temperature or by baking them at temperatures from about 150° F. up to about 275° F. Cure times at baking temperatures range from about 1 hour to about 20 hours.

Foams of the low viscosity polyesters of triethylene glycol and a polycarboxylic acid which is a polymer of an unsaturated fatty acid, and a diisocyanate are usually closed celled and often tend to shrink upon cooling. In order to obviate this tendency, the foams may be subjected to mechanical manipulation, such as rolling or to vacuum in order partially to rupture the closed cells therein. The foams after such treatment, do not shrink.

*Example II*

This example illustrates the formulation and curing of a flexible polyurethane foam of high quality from the low viscosity polyester prepared in accordance with the provisions of Example I. Package A comprises:

| | Parts by weight |
|---|---|
| Polyester (as per Example I) | 100 |
| Water | 2.7 |
| Triethyl amine (catalyst) | 1.4 |
| Didecyl phthalate (plasticizer) | 5–20 |

The foregoing mixture as component A is incorporated with package B which comprises 36 parts by weight of tolylene diisocyanate isomers comprising 80 percent by weight of 2,4-isomer and 20 percent of 2,6-isomer.

These components, may be stirred together in well-known manner to form a foamable mixture.

This mixture may be poured into a mold or other container and allowed to foam and cure at room temperature, or at elevated temperatures.

If shrinkage is to be avoided, it is desirable that the foam be flexed or worked mechanically as by rolling to break the cells in a period of about 10 to 60 minutes after foaming is completed.

If desired, the curing operation may also be speeded up by baking the foamable mixture at a temperature in a range of about 150 to 260° F. until a desired degree of cure is obtained.

A cure at room temperature may be obtained in about 10 days. The mixtures can also be cured at about 158° F. for 16 to 24 hours. Cures may be completed in 1 to 4 hours at 250° F.

The foam is of a density of about 2 pounds per cubic foot. It is exceptionally soft (Pandux value 0–15) and has excellent compression set properties (less than 10 percent ASTM method B) both before and after hydrolytic aging in steam at 220° F. The tensile strength is high (15 p.s.i.) and a load-deflection curve which is relatively free of plateau effects is obtained.

*Example III*

This example is the same as Example I except that the trimethylolethane is replaced by an equivalent amount of pentaerythritol. The resultant polyester can be substituted in Example II for the polyester of Example I to provide a useful foamed polyurethane resin.

*Example IV*

This example illustrates the use of 1,2,6-hexanetriol as a trihydric alcohol. It is substituted in chemically equivalent amount for the trimethylolethane of Example I.

The resultant polyester can be used in place of the polyester of Example I in the formulation of the foamed polyurethane resin of Example II.

*Example V*

This example is a repetition of Example I except that the trimethylolethane of the latter example is replaced by an equivalent amount of trimethylolpropane. The resultant polyester can be mixed with about 0.5 to about 2 equivalents of a polyisocyanate, such as tolylene diisocyanate and with water by the techniques of Example II and reacted to form useful foamed resins.

*Example VI*

In this example, the trimethylolethane of Example I is replaced by an equivalent amount of glycerol. The resultant mixture is esterified to proper acid value to provide a polyester which can be mixed with an isocyanate, such as tolylene diisocyanate and water in accordance with the provisions of Example II and reacted to provide a useful foamed polyurethane resin.

*Example VII*

In this example the triethylene glycol of Example I is replaced by an equivalent amount of tetraethylene glycol. The mixture reacts to provide a polyester which can be mixed with 0.5 to 2 equivalents of tolylene diisocyanate isomers as disclosed in Example II and reacted in accordance with the provisions of the latter example to provide valuable polyurethane foams.

It is within the purview of the present invention preliminarily to react all or a part of the polyester component with diisocyanate, such as tolylene diisocyanate, in the absence of water to provide liquid prepolymers to which water can be added in order to form foamed polyurethane resins. In event that all of the polyester component is thus preliminarily reacted with the diisocyanate in the preparation of the prepolymer, the water required for foaming may be added separately or in combination with such other modifiers, as tertiary amine catalysts and the like as may be desired.

The low viscosity polyesters as disclosed herein can be blended with the diisocyanate component with relative ease. The foams produced have a uniform fine-celled, caviar structure which is usually so desirable.

A quasi prepolymer may also be prepared comprising a portion of the polyester component and all of the diisocyanate component. The polyester to provide a complete mixture is subsequently added. Water and such other modifiers, such as catalysts (tertiary amines) may be included with the added polyester.

The following examples illustrate the prepolymer techniques in the preparation of a polyurethane foam:

*Example VIII*

In this example a prepolymer is prepared comprising:

| | Parts by weight |
|---|---|
| Polyester as per Example I | 70 |
| Tolylene diisocyanate (80–20 mixture) | 30 |

The foregoing mixture is reacted to provide a prepolymer having a viscosity of about 20,000 to 25,000 centipoises.

Plasticizers, such as didecyl phthalate, may be incorporated with the prepolymer, however, this is optional. In a specific example, prepolymer as above described in amount of 100 parts by weight, is incorporated with 10 parts by weight of didecyl phthalate in forming one package or component of a foamable mixture.

The second package comprises:

| | Parts by weight |
|---|---|
| Water | 2.3 |
| N-methyl morpholine | 1 |
| Triethylamine | 0.3 |

The two packages are then mixed together upon suitable apparatus and the mixture is cast, foamed and cured to provide a useful cellulated polyurethane resin.

*Example IX*

In this example a quasi-prepolymer of polyester (the same as that of Example I) and diisocyanate is prepared by reacting a mixture comprising:

| | Parts by weight |
|---|---|
| Polyester | 50 |
| Tolylene diisocyanate mixed isomers (80–20) | 50 |

Reaction may be at room temperature, or it may be expedited by heating the mixture. This mixture is reacted to provide a prepolymer of a viscosity of 1,500 to 2,000 centipoises.

This prepolymer is then incorporated into a mixture comprising:

| | Parts by weight |
|---|---|
| Prepolymer | 100 |
| Added polyester | 50–100 |
| Water | 3.2–4 |
| Didecyl phthalate (optional) | 10 |
| N-methyl morpholine | 1 |
| Triehtylamine | 0.7 |

This mixture may be cast, foamed and cured to provide a useful, cellulated polyurethane resin.

The use of the polyesters coprising triethylene glycol or tetraethylene glycol as diol components and dimer or trimer acids as polycarboxylic acid components in the formation of polyurethane foams has been emphasized in the foregoing examples; in the latter application, the materials have important advantages. However, the utility of the polyesters is not necessarily limited to the foamed polyurethane resin field. It will be apparent that the polyester, such as the polyester of Example I, may be mixed with diisocyanates in the absence of water and employed for coatings. When so applied cellulation does not occur but the mixture is cured at room temperature or by heat to hard, chemically-resistant and solvent resistant thermoset resin films.

We claim:

1. As a new material, a polyester of a mixture consisting essentially of:
   (A) triethylene glycol,
   (B) a trihydric alcohol selected from the class consisting of trimethylolethane and trimethylolpropane, and
   (C) a mixture of dimer acid and trimer acid containing, respectively, 36 and 54 carbon atoms, and being obtained by polymerization of fatty acids containing a plurality of double bonds and being of glyceride drying oils, the mixture of dimer acid and trimer acid containing about 5 to about 35 percent of trimer acid, the rest thereof being essentially dimer acid, the mixture of dimer acid and trimer acid containing not more than about 4 percent of monomeric fatty acids, the relative proportions of the several components in the polyester being approximately within the following ranges:

| | Parts by weight |
|---|---|
| Polymer acids | 70–75 |
| Triethylene glycol | 20–30 |
| Polyhydric alcohol selected from said class | 1–6 | the polyester being of a hydroxyl number in a range of about 40 to about 75, and being of a viscosity of about 18,000 to about 27,000 cps. at 77° F.

2. As a new material, a polyester of a mixture of triethylene glycol and trimethylolethane, and a mixture consisting of dimer acids and trimer acids of linoleic acid in which the trimer acid is present in an amount of about 5 to about 35 percent, the rest of the polymer acids being dimer acids with not more than about 4 percent based upon the acid mixture of monocarboxylic acids, the amounts of the several components being approximately within the following ranges with respect to each other:

| | Parts by weight |
|---|---|
| Polymer acid | 70–75 |
| Triethylene glycol | 20–30 |
| Trimethylolethane | 1–6 | the polyester being of a hydroxyl value of about 40 to about 75 and a viscosity of about 18,000 to about 27,000 cps. at 770° F.

3. A method of forming a polyester of relatively low viscosity from a mixture of dimer acid and trimer acid from linoleic acid wherein the trimer acid is present in an amount of about 5 to 35 percent, the rest of the mixture of acids being essentially dimer acid with not more than about 4 percent based upon the acid mixture of monocarboxylic acid, trimethylolethane and triethylene glycol, the several components being approximately within the following ranges:

| | Parts by weight |
|---|---|
| Polymer acid | 70–75 |
| Triethylene glycol | 20–30 |
| Trimethylolethane | 1–6 | said method comprising the steps of mixing said polymer acid with triethylene glycol and heating the mixture to obtain an acid value of about 20 to about 25, adding trimethylolethane and continuing to heat the mixture until an acid value below about 3 and a viscosity of about 18,000 to about 27,000 cps. at 77° F. are attained.

(References on following page)

References Cited in the file of this patent

UNITED STATES PATENTS

| | | |
|---|---|---|
| 2,429,219 | Cowan et al. | Oct. 21, 1947 |
| 2,764,565 | Hoppe et al. | Sept. 25, 1956 |
| 2,802,795 | Simon et al. | Aug. 13, 1957 |

FOREIGN PATENTS

| | | |
|---|---|---|
| 557,968 | Italy | Feb. 22, 1957 |

OTHER REFERENCES

Cowan et al.: "Oil and Soap," August 1943, pages 153–157.

Moore et al.: "Paper No. 45," April 1957, page 386, Division of Paint, Plastics and Printing Ink Chem. of the A.C.S.

Cowan et al.; Ind. & Eng. Chem., volume 41, No. 8, August 1949, pages 1647–1653.

UNITED STATES PATENT OFFICE
CERTIFICATE OF CORRECTION

Patent No. 3,068,254　　　　　　　　　　　　　　December 11, 1962

Louis R. Le Bras et al.

It is hereby certified that error appears in the above numbered patent requiring correction and that the said Letters Patent should read as corrected below.

Column 1, lines 56 to 59, for that portion of the formula reading
$C_3(CH_2)_5-$　read　$CH_3(CH_2)_5-$ Signed and sealed this 3rd day of March 1964.

(SEAL)
Attest:
ERNEST W. SWIDER

Attesting Officer

EDWIN L. REYNOLDS

Acting Commissioner of Patents